United States Patent [19]
Johnson et al.

[11] Patent Number: 5,916,933
[45] Date of Patent: Jun. 29, 1999

[54] BISPHENOL-CONTAINING RESIN COATING ARTICLES AND METHODS OF USING SAME

[75] Inventors: Calvin K. Johnson, Lockport; Kwok-tuen Tse, Berwyn, both of Ill.

[73] Assignee: Borden Chemical, Inc., Columbus, Ohio

[21] Appl. No.: 08/810,449

[22] Filed: Mar. 4, 1997

Related U.S. Application Data

[62] Division of application No. 08/411,887, Mar. 28, 1995, Pat. No. 5,639,806.

[51] Int. Cl.$^6$ .............................. C08L 61/12; C08K 3/34
[52] U.S. Cl. .................... 523/208; 523/130; 523/139; 524/541; 524/611; 525/137; 525/390; 525/534; 528/86; 528/155; 528/219
[58] Field of Search ..................... 523/208, 130, 523/139; 524/541, 611; 528/219, 155, 86; 525/137, 390, 534

[56] References Cited

U.S. PATENT DOCUMENTS

| | | | |
|---|---|---|---|
| 3,558,560 | 1/1971 | Huck et al. | 252/182.24 |
| 3,928,526 | 12/1975 | Koyama | 264/236 |
| 4,010,163 | 3/1977 | Hesse et al. | |
| 4,426,484 | 1/1984 | Saeki et al. | 523/145 |
| 4,518,039 | 5/1985 | Graham et al. | 166/276 |
| 4,529,751 | 7/1985 | Saeki | 523/145 |
| 4,732,920 | 3/1988 | Graham et al. | 523/145 |
| 4,785,884 | 11/1988 | Armbruster | 428/407 |
| 4,804,723 | 2/1989 | Harris et al. | 525/534 |
| 4,900,671 | 2/1990 | Pokora et al. | 528/211 |
| 5,032,642 | 7/1991 | Lemon et al. | |
| 5,043,365 | 8/1991 | Gardziella et al. | 524/541 |
| 5,153,298 | 10/1992 | Pokora et al. | 528/86 |
| 5,218,038 | 6/1993 | Johnson et al. | 524/541 |
| 5,420,174 | 5/1995 | Dewprashad | 523/208 |
| 5,552,509 | 9/1996 | Takashima et al. | 528/155 |
| 5,571,854 | 11/1996 | Ishida et al. | 528/219 |

FOREIGN PATENT DOCUMENTS

| | | | |
|---|---|---|---|
| 586233 | 11/1959 | Canada. | |
| 0412499 | 2/1991 | European Pat. Off. | 528/219 |
| 452100 | 10/1991 | European Pat. Off. . | |
| 2264829 | 10/1975 | France. | |
| 2339490 | 5/1974 | Germany. | |
| 53-114725 | 10/1978 | Japan. | |
| 55-108472 | 8/1980 | Japan. | |
| 2215872 | 8/1990 | Japan. | |
| 4100848 | 4/1992 | Japan. | |
| 5156123 | 6/1993 | Japan. | |
| 156137 | 3/1922 | United Kingdom. | |
| 950291 | 2/1964 | United Kingdom. | |

*Primary Examiner*—Andrew E. C. Merriam
*Attorney, Agent, or Firm*—Stevens, Davis, Miller & Mosher, L.L.P.

[57] ABSTRACT

Proppants comprising a particle coated with a composition comprising bisphenol-aldehyde novolak resin, a bisphenol homopolymer or mixtures including such polymers are disclosed. Foundry sands comprising a particle coated with a composition comprising bisphenol-aldehyde novolak resin, a bisphenol homopolymer or mixtures including such polymers are disclosed. Methods of making and using these proppant particles in subterranean formations or making and using these foundry sands in foundries are also disclosed.

28 Claims, 3 Drawing Sheets

BISPHENOL-CONTAINING RESIN COATING ARTICLES AND METHODS OF USING SAME

This is a division of application Ser. No. 08/411,887 filed Mar. 28, 1995, now U.S. Pat. No. 5,639,806.

BACKGROUND OF THE INVENTION

1. Field of the Invention

The present invention is directed to particulate substrates coated with a resin comprising bisphenol-aldehyde novolak polymer or a bisphenol homopolymer. Depending upon the resin selected, the substrate selected and how the resin is combined with the substrate, the resulting resin coated particle is useful in either subterranean formations as a proppant or in shell cores and molds for the foundry industry. The present invention also relates to methods of making or using the resins or coated substrates.

2. Description of Background Art

The use of phenolic resin coated proppants is disclosed by U.S. Pat. No. 5,218,038 to Johnson et al (the disclosure of which is incorporated by reference in its entirety). In general, proppants are extremely useful to keep open fractures imposed by hydraulic fracturing upon a subterranean formation, e.g., an oil or gas bearing strata. Typically, the fracturing is desired in the subterranean formation to increase oil or gas production. Fracturing is caused by injecting a viscous fluid or a foam at high pressure into the well and placing a particulate material, referred to as a "propping agent" or "proppant" in the formation to maintain the fracture in a propped condition when the injection pressure is released. The proppants are carried into the well by suspending them in the fluid or foam. As the fracture forms, it is filled with proppant and fluid or foam. Upon release of the pressure, the proppants form a pack which serves to hold open the fractures. The goal of using proppants is to increase production of oil and/or gas by providing a highly conductive channel in the formation. Choosing a proppant is critical to the success of well stimulation.

The propped fracture thus provides a highly conductive channel in the formation. The degree of stimulation afforded by the hydraulic fracture treatment is largely dependent upon the permeability and width of the propped fracture. If the proppant is an uncoated substrate and is subjected to high stresses existing in a gas/oil well, the substrate may be crushed to produce fines. Fines will subsequently reduce conductivity within the proppant pack. However, a resin coating will enhance crush resistance of a coated particle above that of the substrate alone.

Known resins used in resin coated proppants include epoxy, furan, phenolic resins and mixtures of these resins. The resins are from about 1 to about 8 percent by weight of the total coated particle. The particulate substrate may be sand, ceramics, or other particulate substrate and has a particle size in the range of USA Standard Testing screen numbers from about 8 to about 100 (i.e. screen openings of about 0.0937 inch to about 0.0059 inch).

Resin coated proppants come in two types: precured and curable. Precured resin coated proppants comprise a substrate coated with a resin which has been significantly crosslinked. The resin coating of the precured proppants provides crush resistance to the substrate. Since the resin coating is already cured before it is introduced into the well, even under high pressure and temperature conditions, the proppant does not agglomerate. Such precured resin coated proppants are typically held in the well by the stress surrounding them. In some hydraulic fracturing circumstances, the precured proppants in the well would flow back from the fracture, especially during clean up or production in oil and gas wells. Some of the proppant can be transported out of the fractured zones and into the well bore by fluids produced from the well.

Flowing back of proppant from the fracture is undesirable and has been controlled to an extent in some instances by the use of a proppant coated with a curable resin which will consolidate and cure underground. Phenolic resin coated proppants have been commercially available for some time and used for this purpose. Thus, resin-coated curable proppants may be employed to "cap" the fractures to prevent such flow back. The resin coating of the curable proppants is not significantly crosslinked or cured before injection into the oil or gas well. Rather, the coating is designed to crosslink under the stress and temperature conditions existing in the well formation. This causes the proppant particles to bond together forming a 3-dimensional matrix and preventing proppant flowback.

These curable phenolic resin coated proppants work best in environments where temperatures are sufficiently high to consolidate and cure the phenolic resins. However, conditions of geological formations vary greatly. In some gas/oil wells, high temperature (>180° F.) and high pressure (>6,000 psi) are present downhole. Under these conditions, most curable proppants can be effectively cured. Moreover, proppants used in these wells need to be thermally and physically stable, i.e. do not crush appreciably at these temperatures and pressures.

Many shallow wells often have downhole temperatures less than 130° F., or even less than 100° F. Conventional curable proppants will not cure properly at these temperatures. Sometimes, an activator can be used to facilitate curing at low temperatures. Another method is to catalyze proppant curing at low temperatures using an acid catalyst in an overflush technique. Systems of this type of curable proppant have been disclosed in U.S. Pat. No. 4,785,884 and the disclosure of this patent is incorporated by reference in its entirety. In the overflush method, after the curable proppant is placed in the fracture, an acidic catalyst system is pumped through the proppant pack and initiates the curing even at low temperatures (about 100° F.). This causes the bonding of proppant particles.

Due to the diverse variations in geological characteristics of different oil and gas wells, no single proppant possesses all properties which can satisfy all operating requirements under various conditions. The choice of whether to use a precured or curable proppant or both is a matter of experience and knowledge as would be known to one skilled in the art.

In use, the proppant is suspended in the fracturing fluid. Thus, interactions of the proppant and the fluid will greatly affect the stability of the fluid in which the proppant is suspended. The fluid needs to remain viscous and capable of carrying the proppant to the fracture and depositing the proppant at the proper locations for use. However, if the fluid prematurely loses its capacity to carry, the proppant may be deposited at inappropriate locations in the fracture or the well bore. This may require extensive well bore cleanup and removal of the mispositioned proppant.

It is also important that the fluid breaks (undergoes a reduction in viscosity) at the appropriate time after the proper placement of the proppant. After the proppant is placed in the fracture, the fluid shall become less viscous due to the action of breakers (viscosity reducing agents) present in the fluid. This permits the loose and curable proppant particles to come together, allowing intimate contact of the particles to result in a solid proppant pack after curing. Failure to have such contact will give a much weaker proppant pack.

Foam, rather than viscous fluid, may be employed to carry the proppant to the fracture and deposit the proppant at the proper locations for use. The foam is a stable foam that can suspend the proppant until it is placed into the fracture, at which time the foam breaks. Agents other than foam or viscous fluid may be employed to carry proppant into a fracture where appropriate.

While useful proppants are known, it would be beneficial to provide proppants having improved features such as compressive strength as well as higher long term conductivity, i.e., permeability, at the high closure stresses present in the subterranean formation. Improved compressive strength better permits the proppant to withstand the forces within the subterranean formation. High conductivity is important because it directly impacts the future production rate of the well. It would also be beneficial to provide proppants which minimize or eliminate free phenol or hexamethylenetetramine (HEXA) in the resin. Any free phenol and HEXA are prone to water dissolution under down-hole applications. This can affect other fluid parameters, such as breaker interaction, high temperature stability, etc.

Another use of sand or other particulate substrates coated with resin is in the foundry industry. However, in the foundry industry, the resin is typically from about 1 to about 6 percent by weight of the coated particle. Moreover, resin coated foundry particulates have a particle size in the range of USA Standard Testing screen numbers from 16 to about 270 (i.e., a screen opening of 0.0469 inch to 0.0021 inch).

Typically the particulate substrates for foundry use are granular refractory aggregate. Examples of refractory aggregates include silica sand, chromite sand, zircon sand, olivine sand and mixtures thereof. For purposes of the disclosure of the present invention such materials are referred to as "sand" or "foundry sand".

In the foundry art, cores or molds for making metal castings are normally prepared from a mixture of aggregate material, such as foundry sand, and a binding amount of a binder or binder system. A number of binders or binder systems for foundry cores and molds are known. Typically, after the aggregate material and binder have been mixed, the resulting mixture is rammed, blown or otherwise formed to the desired shape or pattern, and then cured to a solid, cured state. A variety of processes have been developed in the foundry industry for forming and curing molds and cores.

One popular foundry process is known as the Croning or C process (more commonly known as the shell process). In this process, foundry sand is coated with a thermoplastic resin, a crosslinker and optionally other additives. Thermoplastic resin can be in solid form or in solution with a volatile organic solvent or mixtures of solvent and water. If the thermoplastic resin is a solid, the coating process requires the sand be heated to temperatures above the resin's melting point. Then the resin, crosslinker and other additives are coated evenly on the foundry sand to give a curable coating composition.

If the resin is in a solution, sand can be coated at temperatures at which the solvent can be readily removed. This process is also referred to as the liquid shell process. Frequently, crosslinker and additives are dissolved (or dispersed) in the solvent with the resin. The resinous mixture is added to warm sand. With agitation, the solvent is removed, leaving a curable coating on the sand particles. It is also possible to incorporate resin additives at other steps of the coating process.

In either cases, a curable resin composition is coated onto the sand to form free flowing resin coated sand (particles). Subsequently, the resin coated sand is packed into a heated mold, usually at 350° to 750° F. to initiate curing of the thermoplastic polymer by reaction with the crosslinker to form thermosetting polymer. After the curing cycle, a shell of cured resin coated sand is formed adjacent to the heated surface. Depending upon the shape of the heated surfaces, shell molds and cores can be made and used in a foundry by this method.

While the above phenol-formaldehyde resins have been used as binders in these processes for making foundry shell cores and molds, they have limitations. It would be beneficial to provide an alternative to the resins typically employed for coating foundry sand. Such an alternative would be especially desirable if it minimizes or eliminates free phenol to be more environmentally acceptable, has a higher melt point to reduce caking or lumping during storage, or has a higher tensile strength to reduce the amount of resin employed. It would also be desirable if the alternative has higher plasticity, to be less prone to thermal shock, and faster resin breakdown, to achieve better shakeout characteristics.

OBJECTS OF THE INVENTION

It is an object of the present invention to provide proppants coated with bisphenol-aldehyde novolak polymer or a bisphenol homopolymer.

It is another object of the present invention to provide foundry sand coated with bisphenol-aldehyde novolak polymer or a bisphenol homopolymer.

It is another object of the present invention to provide methods of using proppant coated with a bisphenol-aldehyde novolak polymer or a bisphenol homopolymer.

It is another object of the present invention to provide methods of using foundry sand coated with a bisphenol-aldehyde novolak polymer or a bisphenol homopolymer to make foundry shell cores and molds.

It is another object of the present invention to provide methods of adding aldehyde to bisphenol-aldehyde novolak polymers and bisphenol homopolymers, as well as provide polymers made by such methods.

These and other objects of the present invention will become apparent from the following specification.

SUMMARY OF THE INVENTION

Figure 1A:
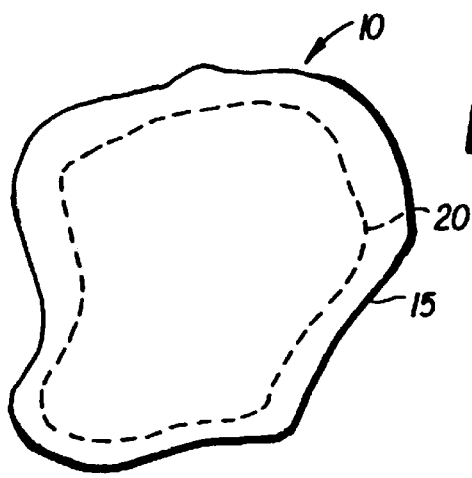
FIG. 1A shows a schematic drawing of a resin coated particle of the present invention for use as a proppant.

The invention provides an improved resin-coated proppant comprising a particulate substrate and a bisphenolic resin coating composition combined with hexamethylenetetramine (HEXA), formaldehyde, paraformaldehyde, oxazolidines, phenol-aldehyde resole polymers and/or other known curing agents as a cross-linking agent to achieve a precured or curable proppant. The bisphenolic resin comprises a bisphenol-aldehyde novolak polymer or a bisphenol homopolymer. Bisphenol materials have the following Formula I:

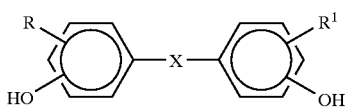

wherein R and $R^1$ are independently alkyl, aryl, arylalkyl or H and are located meta to the respective OH group on its respective aromatic ring shown in Formula I, X is a direct bond, sulfonyl, alkylidene unsubstituted or substituted with halogen, cycloalkylidene, or halogenated cycloalkylidene.

Alkylidene is defined by Formula II:

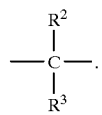

$R^2$ and $R^3$ are independently selected from H, alkyl, aryl, arylalkyl, halogenated alkyl, halogenated aryl and halogenated arylalkyl, with an absence of bisphenol F for the novolak polymer when the proppant is a curable proppant. Preferably, there is also an absence of bisphenol E for the novolak polymer when the proppant is a curable proppant.

The invention also provides improved methods of using the above-described curable and/or precured proppants for treating subterranean formations. The coating composition comprises (i) a bisphenol-aldehyde novolak polymer, bisphenol homopolymer, or mixtures thereof and (ii) HEXA, formaldehyde, paraformaldehyde, oxazolidines, a phenol-aldehyde resole polymer, other known curing agents or mixtures thereof as a crosslinking agent. However, unlike the composition aspects of the present invention, in the method of the present invention, the polymer of the curable proppant may contain bisphenol F.

When the method employs a precured coating composition on the proppant, the proppant is put into the subterranean formation without a need for additional curing within the formation. Advantages of the precured proppant of the present invention include that phenol is eliminated (when the crosslinker does not contain phenol) or reduced.

When the method employs a curable coating composition on the proppant, the method may further comprise curing the curable coating composition by exposing the coating composition to sufficient heat and pressure in the subterranean formation to cause crosslinking of the resins and consolidation of the proppant. In some cases an activator can be used to facilitate consolidation of curable proppant.

In another embodiment employing a curable coating composition on the proppant, the method further comprises low temperature acid catalyzed curing at temperatures as low as 70° F. An example of low temperature acid catalyzed curing is disclosed by U.S. Pat. No. 4,785,884 incorporated herein by reference in its entirety.

Bisphenol-based polymers are less water soluble than phenol-based polymers. Reduced water solubility of the systems of the present invention is advantageous to avoid having dissolved components of resins interfere with the performance of the proppant or fracturing fluid, or both, in a subterranean formation such as a natural gas or oil well. Also, the resin coated proppants of the present invention, except those with phenol-aldehyde resole polymers as crosslinkers, do not contain free phenol. Although low levels of phenol are not dangerous, the absence of even low levels of phenol makes the proppant more environmentally acceptable. Curable proppants made with bisphenol-aldehyde resin are also better in maintaining conductivity than commercial phenol-aldehyde coated proppants. The improved conductivity is especially displayed under high (greater than 6,000 psi) stress levels.

The present invention also provides an improved resin coated foundry sand and methods for using such foundry sand to make shell cores and molds. The resin comprises a bisphenol-aldehyde novolak polymer or a homopolymer of bisphenol and a suitable crosslinking agent. The bisphenol is defined by Formula I, with the proviso that where X is alkylidene, $R^2$ and $R^3$ of Formula II are selected independently from H, alkyl, aryl, arylalkyl, halogenated alkyl, halogenated aryl and halogenated arylalkyl, with an absence of bisphenol F for the novolak polymer. Preferably, there is also an absence of bisphenol E for the novolak polymer.

The foundry sand coated with bisphenol-aldehyde novolak polymer has the advantage of reducing or eliminating free phenol as compared to phenol-aldehyde novolak polymer.

The foundry sand coated with bisphenol homopolymer has a number of advantages over phenol-aldehyde novolak polymer coated sand. Bisphenol homopolymer resin results in an absence of free phenol. Thus, the resins are more environmentally acceptable. Additionally, homopolymer resin coated sand has a higher melt point. Thus, the coated particles are less prone to caking or lumping during storage. The homopolymer resin coated sand also has a higher tensile strength. Thus, less resin can be employed to reach a given strength resulting in a cost saving. The homopolymer resin coated sand also has higher plasticity. Thus, foundry cores and molds made from these coated particles are less prone to thermal shock.

Also, the homopolymer resins are more susceptible to thermal degradation. Thus, foundry cores and molds made with sands coated with these resins break down more readily when subjected to metal pouring temperatures. This results in faster shakeout of cores and molds. Faster shakeout results in reduced production time.

The present invention also provides (i) a method for adding aldehyde to the bisphenol-aldehyde novolak polymers and bisphenol homopolymers to create aldehyde-modified polymers, and (ii) polymers made by such a method.

DETAILED DESCRIPTION OF THE PREFERRED EMBODIMENTS

1. Proppants Coated with Bisphenol-Aldehyde Novolak Polymer-Containing Resins

The first embodiment of the present invention is a resin coated particulate material wherein the resin includes bisphenol-aldehyde novolak polymer. The substrate may be sand or other suitable particulate material. The novolak polymer typically comprises bisphenol and aldehyde in a molar ratio from about 1:0.85 to about 1:0.4. Any suitable aldehyde may be used for this purpose. The aldehyde may be formalin, paraformaldehyde, formaldehyde, acetaldehyde, furfural, benzaldehyde or other aldehyde sources. Formaldehyde itself is preferred. Usually, these novolak polymers are made with acid catalysts, such as oxalic acid, sulfuric acid, sulfamic acid and metal catalysts, such as zinc acetate. The coating composition typically comprises at least 10 weight % novolak polymer, preferably at least about 20 weight % novolak polymer. The remainder of the coating composition could include crosslinking agents, modifiers or other appropriate ingredients.

The bisphenol of the novolak polymer is selected from bisphenols of Formula I:

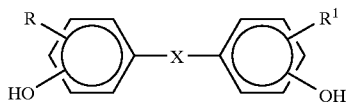

I $R$ and $R^1$ are independently alkyl, aryl, arylalkyl or H and are meta to the respective hydroxy group on the respective aromatic ring of Formula I. Unless otherwise defined, alkyl is defined as having 1 to 6 carbon atoms, and aryl is defined as having 6 carbon atoms in its ring. X is a direct bond, sulfonyl, alkylidene unsubstituted or substituted with halogen, cycloalkylidene, or halogenated cycloalkylidene. Alkylidene is a divalent organic radical of Formula II:

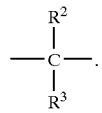

II

When X is alkylidene, $R^2$ and $R^3$ are selected independently from H, alkyl, aryl, arylalkyl, halogenated alkyl, halogenated aryl and halogenated arylalkyl. However, there is the proviso of an absence of bisphenol F, i.e., absence of $R^2$ and $R^3$ as H, for bisphenol of the novolak polymer when the proppant is a curable proppant. The proviso is required for the composition aspects of the curable proppants of the present invention. The proviso is preferred when employing curable proppants according to the method aspects of the present invention. Preferably, there is an absence of bisphenol F for precured proppants and their methods of use. Also, preferably, there is an absence of both bisphenol F and bisphenol E for curable and precured proppants and their methods of use.

When X is halogenated alkylidene, one or more of the hydrogen atoms of the alkylidene moiety of Formula II are replaced by a halogen atom. Preferably the halogen is fluorine or chlorine. Also, halogenated cycloalkylidene is preferably substituted by fluorine or chlorine on the cycloalkylidene moiety.

Typical bisphenols of Formula I include the following:

Bisphenol A

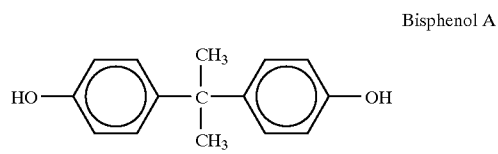

Bisphenol C

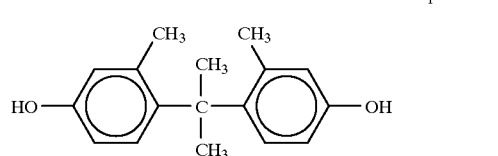

Bisphenol E

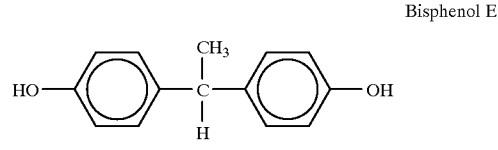

Bisphenol S

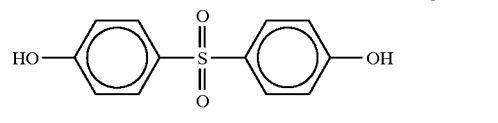

Bisphenol Z

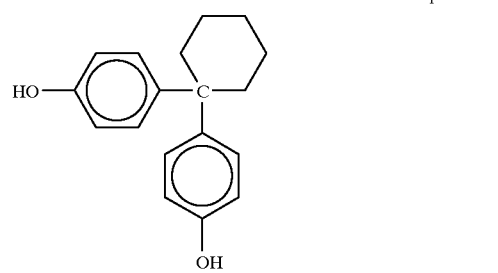

Some of the embodiments of the present invention, according to Formula I, encompass the following bisphenol:

Bisphenol F

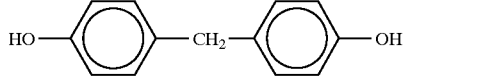

The above formulae show the para-para isomers of the typical bisphenols. It is noted that other isomers of these compounds also exist.

The present invention includes novolak polymers which contain any one of the bisphenols of Formula I, mixtures of the bisphenols of Formula I, or mixtures of one or more of the bisphenols of Formula I with substituted or unsubstituted phenol. The novolak polymer may optionally be further modified by the addition of Vinsol®, epoxy resins, bisphenol, waxes, or other known resin additives. One mode of preparing an alkylphenol-modified bisphenol novolak polymer is to combine an alkylphenol and bisphenol at a molar ratio above 0.05:1. This combination is reacted with a source of formaldehyde under acidic catalysis, or divalent metal catalysis (e.g., Zn, Mn). During this reaction, the combination of alkylphenol and bisphenol is present in molar excess relative to the formaldehyde present. Under acidic conditions, the polymerization of the methylolated bisphenols is a faster reaction than the initial methylolation from the formaldehyde. Consequently, a polymer structure is built up consisting of bisphenolic and alkylphenolic nuclei, linked together by methylene bridges, and with essentially no free methylol groups. In the case of metal ion catalysis, the polymerization will lead to methylol and benzylic ethers, which subsequently break down to methylene bridges, and the final product is essentially free of methylol groups.

The present invention also includes particulate material coated with blends of the bisphenol-aldehyde novolak polymer with conventional novolaks.

The resin composition also includes appropriate crosslinking agents such as hexamethylenetetramine (HEXA), paraformaldehyde, oxazolidines, or other aldehyde donors and/or phenol-aldehyde resole polymers. Each of these crosslinkers can be used by itself or in combinations with other crosslinkers. The resole polymer may contain substituted or unsubstituted phenol.

The phenol-aldehyde resole resin has a phenol: aldehyde molar ratio from about 1:1.2 to about 1:3. A preferred mode of preparing the resole resin is to combine phenol with a source of aldehyde such as formaldehyde, acetaldehyde, furfural, benzaldehyde or paraformaldehyde under alkaline catalysis. During such reaction, the aldehyde is present in molar excess. It is preferred that the resole resin have a molar ratio of phenol to formaldehyde from about 1:1.5 to 1:2.5. The resoles may be conventional resoles or modified resoles. Modified resoles are disclosed by U.S. Pat. No. 5,218,038, incorporated herein by reference in its entirety. Such modified resoles are prepared by reacting aldehyde with a mixture of unsubstituted phenol and at least one phenolic material selected from the group consisting of arylphenol, alkylphenol, alkoxyphenol, and aryloxyphenol.

The coating composition of this invention comprises up to about 25 weight percent HEXA and/or up to about 90 weight percent resole polymers based on the total weight of coating composition. Where HEXA is the sole crosslinking agent, the resin comprises from about 5 to about 25 weight percent of the resin. Where the phenol-aldehyde resole polymer is the sole crosslinking agent, the resin contains from about 20 to about 90 weight percent of the resole polymer. The composition may also comprise combinations of these crosslinkers.

The novolak polymers are made by mixing one or more bisphenols of Formula I (and optionally a substituted or unsubstituted phenol) with a solvent, such as n-butyl acetate, at elevated temperature. An acid catalyst such as oxalic acid or methanesulfonic acid is then added and mixed with the bisphenol. Then an aldehyde, typically formaldehyde, is added to the mixture and the mixture is refluxed. It is noted that the preparation of the novolak resin can occur under acidic catalysis, or divalent metal catalysis (e.g., Zn, Mn), wherein the bisphenol is present in greater than equimolar amount relative to the source of aldehyde. After reflux, water is collected by azeotropic distillation with n-butyl acetate. After removal of the water and n-butyl acetate, the resin is flaked to yield resin products. Alternatively, the polymers can be made using water as a solvent.

After making the resin, the crosslinking agent, resin and particulate material are mixed at conditions to provide either a precured or curable coating composition, as desired. Precured or curable proppants can be made by coating particulate material, e.g., sand, with the coating composition. Whether a coating composition is of the precured or curable type depends upon a number of parameters. Such parameters include the ratio of the novolak resin to the curing agent; the acidity of the novolak resin; the pH of the resole resin; the amount of the crosslinking agent; the time of mixing the coating compositions and particles; the temperature of the coating compositions and particles during mixing; catalysts (if any) used during the particle coating; and other process parameters as known to those skilled in the art.

The resin is coated onto the particulate material by a hot coat process or a warm coat process. The hot coat process includes adding the resin to hot sand, or other particulate material, which has been heated to a temperature above the resin's melting point. Then a crosslinking agent is added. Then this mixture is stirred for the desired time to produce a particulate material coated with either a precured or curable resin as desired. Typically, the mixing occurs in the presence of a coupling agent such as an organosilane and a lubricant, such as a silicone fluid, such as L-45 manufactured by Dow Corning Corporation, Midland, Mich. The coated sand is then removed, cooled and sieved.

In the warm coat process, the resin is in solution when it is mixed with the particulate substrate, crosslinker or other appropriate ingredients. The solvent is then removed resulting in a free flowing proppant coated with curable resin.

FIG. 1A shows a proppant 10 comprising a particle 20 and a resin coating 15. The resin, crosslinking agent and particle 20 is mixed to produce the proppant 10. The proppant 10 is prepared to comprise from about 1 to about 8 weight percent coating 15. Also, the particle 20 has a pre-coated size in the range of USA Standard Testing screen numbers from about 8 to about 100.

The present invention results in precured proppants having crush strength at least equal to that of conventional precured proppants which include phenol-formaldehyde novolak resins. Advantageously, the proppants of the present invention achieve this crush strength while reducing the presence of free phenol. Embodiments employing resins made in the absence of the resole resin can eliminate the presence of free phenol. Thus, the amount of free phenol released to the environment is minimized or eliminated.

The following parameters are useful when characterizing coated proppants of the present invention.

Compressive strength of curable proppants is defined as that measured according to the following procedure. A 2 weight percent KCl solution (doped with a small amount of detergent to enhance wetability) is added to proppant. The mixture is gently agitated to wet the proppant. The wet proppant is then packed into 50 mL (103 millimeter long by 29 millimeter inner diameter) heating tape-wrapped steel tubes. After packing the proppant, a load of 1,000 psi is applied using a press. The specimens are then heated to 200° F. and held at 200° F. for 24 hours to cure the specimens. During the curing process, loose proppant particles become a consolidated mass. After 24 hours, the specimens are removed as slugs. Both ends of each slug are smoothed to give flat surfaces and the slugs are cut to two inches in length. Compressive strength tests of the slugs are determined using a tensile tester manufactured by Detroit Testing Machine Company and the results were reported. Typical compressive strengths of proppants of the present invention range from 50 to 3000 psi or higher.

Hot tensile strength of curable proppants is defined as that measured by heating a two part bracket mold until it reaches a temperature of 450° F. Uncured resin coated sand is blown into the hot mold and the sand is kept at this temperature for 3 minutes to cure. After completion of curing time, tensile measurement are made automatically with a built-in tensile tester. Typical hot tensile strengths of proppants of the present invention range from 0 to 500 psi or higher.

Long term conductivity is defined as that measured by the "Proppant Consortium Baseline Procedure," developed by Stim-Lab, Inc., Duncan, Okla.

Melt point of curable resin coated sand is defined as that determined using a melt point bar. A melt point bar is a brass metal bar (18 inches long and 2 inches wide) with an electric heating element at one end. Therefore, a temperature gradient can be established across the length of the bar and the temperature across the bar is monitored with thermometers or thermocouples. Typically, the temperature is about 315 to about 330° F. at the hottest end of the bar. Using a funnel, a uniform strip of resin coated sand is laid on the heated bar and cured for 60 seconds. Then an air jet at 10 psi pressure is blown on the sand and any uncured sand will be blown off the bar. Melt point is the lowest temperature at which the resin coated sand forms a mass.

Due to the nature of some resin coated sands, the melt point procedure described above is sometimes inadequate. Thus, a modified melt point determination was developed. In this test, the same melt point bar described above is utilized. Resin coated sand is placed onto the bar and cured for 60 seconds as in the standard melt point procedure. However, after the 60 second cure time, the melt point bar is then turned 90° on its side and loose coated sand particles are allowed to roll off the bar. The temperature where the proppant still sticks to the bar is noted as the modified melt point.

Melt viscosity measurement of thermoplastic polymers (such as phenol-formaldehyde novolaks) is determined using a melt flowmeter. The melt flowmeter is a metal block (10 inches square and 3 inches thick) which is electrically heated to 266°±1° F. On the square surface of the block, there is a 4 inches long semi-circular groove (3/16 inches in diameter) with a holding cup (½ inches in diameter) on one end. With the block in the horizontal position, 0.5 gm of resin is ground and placed in the holding cup for 2 minutes to melt. After this time, the block is tilted 30°. This allows the molten resin to flow out the holding cup and down the groove. Melt viscosity is defined as the time taken for the molten resin to travel 1.97 inches of the groove.

2. Proppant Coated with Bisphenol Homopolymer-Containing Resin

In a second embodiment of the present invention, the coated particulate material comprises a substrate, as described above, coated with a coating composition which includes a homopolymer of bisphenol. The resin composition also includes appropriate crosslinking agents such as hexamethylenetetramine (HEXA), paraformaldehyde, oxazolidines, or other aldehyde donors and/or phenol-aldehyde resole polymers. Each of these crosslinkers can be used by itself or in combinations with other crosslinkers. The resole polymer may contain substituted or unsubstituted phenol.

The coating composition typically contains at least about 10 (preferable at least about 20) weight percent bisphenol homopolymer resin, up to about 25 weight percent HEXA and up to about 90 weight percent phenol-aldehyde resole polymer. Where HEXA is the crosslinking agent, in the absence of the resole polymer, the composition contains from about 5 to about 25 weight percent HEXA. Where the resole polymer is the crosslinking agent in the absence of HEXA, the composition contains from about 20 to about 90 weight percent resole polymer, preferably from about 30 to about 70 weight percent resole polymer.

The coating composition may be made of the curable or precured type as desired. Whether the coating composition will be of the curable or precured type may be varied by adjusting the parameters described above for the bisphenol-formaldehyde novolak polymer-containing composition. Moreover, the homopolymer may be blended with the above-described bisphenol-formaldehyde novolak polymers and/or conventional phenolic novolak polymers.

The bisphenol material from which the homopolymer is made is that of Formula I above, wherein R and $R^1$ are independently alkyl, aryl, arylalkyl or H, and are meta to the respective hydroxy group on the respective aromatic ring of Formula I. X of Formula I is a direct bond, sulfonyl, alkylidene unsubstituted or substituted with halogen, cycloalkylidene, or halogenated cycloalkylidene. However, where X is alkylidene, $R^2$ and $R^3$ of Formula II, above are independently selected from H, alkyl, aryl, arylalkyl, halogenated alkyl, halogenated aryl and halogenated arylalkyl. Typical bisphenols include bisphenol A, bisphenol C, bisphenol E, bisphenol F, bisphenol S and bisphenol Z.

Homopolymers of bisphenols are available from Enzymol International, Inc., Columbus, Ohio. These polymers were made by enzyme catalyzed polymerization of bisphenol. Details of this process can be found in some U.S. patents such as U.S. Pat. Nos. 4,900,671 and 5,153,298. A typical method of preparing the bisphenol homopolymer includes the step of reacting bisphenol at a concentration of at least about 1 gram per 100 milliliters with a peroxidase enzyme in the presence of a peroxide in a medium which contains an organic solvent and water. The volumetric ratio of the organic solvent to water ranges from about 1:10 to 10:1. Typically, the bisphenol and organic solvent are present at a volumetric ratio of about 0.8:1 to 1:1. This reaction step generates radicals of the bisphenol which react to form the polymeric resin. The resin is then recovered from the medium.

As discussed above, FIG. 1A shows the structure of the particle 10 of proppant comprising the particle 15 and a resin coating 20. When it is desired to prepare the particulate material for use as a proppant, the ingredients are combined such that the resulting coated particulate material 10 is from about 1 to about 8 weight percent coating composition. Also, the particles 15 on which the resin 20 is coated have a precoated size in the range of USA Testing Standard screen numbers from about 8 to about 100.

The present invention contemplates coating proppants with (i) the bisphenol homopolymers or (ii) blends of the bisphenol homopolymers with bisphenol-aldehyde novolak polymer and/or conventional phenol-aldehyde novolak polymers. When the bisphenol polymers are mixed with resole polymers (as curing agents or otherwise), the resole polymers may be conventional resole polymers or modified resole polymers, as discussed above, of U.S. Pat. No. 5,218,038 to Johnson et al, incorporated herein by reference in its entirety.

The bisphenol homopolymer-coated articles of the present invention, when made as precured proppants, have a crush strength comparable to that of conventional phenol-formaldehyde novolak polymer coated particulate material. However, the bisphenol homopolymer-coated particulate material has the advantage of reducing or eliminating (where no phenol-containing resin is employed) release of free phenol to the environment.

The bisphenol homopolymers also have the advantage that they are less water soluble than phenol-aldehyde novolak polymers. Therefore, the proppant will be less prone to water dissolution when employed in subterranean formations.

3. Foundry Sand Coated with Bisphenol-Containing Resins

In other embodiments of the present invention, the coated particulate material comprises a foundry sand substrate coated with resin as described above. These embodiments contemplate coating foundry sand with (i) the bisphenol-aldehyde novolak polymers, (ii) the bisphenol homopolymers, (iii) blends of the bisphenol homopolymers with bisphenol-aldehyde novolak polymer and/or conventional phenol-aldehyde novolak polymer, or (iv) blends of the bisphenol-aldehyde novolak polymer with conventional phenol-aldehyde. The coating composition typically comprises at least about 10 (preferably at least about 20) weight % novolak polymer, at least about 10 (preferably at least about 20) weight % bisphenol homopolymer resin, or mixtures of these novolak polymers and homopolymers as described above. However, unlike proppants which are coated with curable or precured resin, foundry sand are only coated with curable resin.

The bisphenol of the novolak polymer and homopolymer is that of Formulae I and II described above. However, where X of Formula I is alkylidene, $R^2$ and $R^3$ of Formula II are independently selected from H, alkyl, aryl or arylalkyl. Typical bisphenols of Formula I include bisphenol A, bisphenol C, bisphenol E, bisphenol F, bisphenol S and bisphenol Z. However, the bisphenol of the novolak polymer excludes bisphenol F. Preferably, the bisphenol of the novolak polymer excludes both bisphenol F and bisphenol E.

The present invention includes novolak polymers which contain any one of the bisphenols of Formula I as defined above, mixtures of such bisphenols of Formula I, or mixtures of one or more of such bisphenols of Formula I with substituted or unsubstituted phenol as described above for the resins of the proppants. The novolak polymer may be modified by the addition of Vinsol® or epoxy resins, or bisphenol, or waxes, or other known resins as described above.

The resin composition also includes appropriate crosslinking agents, and amounts of such crosslinking agents, as described above. For example, the coating composition typically contains up to about 25 weight percent HEXA and up to about 90 weight percent phenol-aldehyde resole resin.

The resin is coated onto the particulate material by the hot coat process or warm coat processes described above. In use, the resin coated particulate material is shaped and then cured to form foundry shell molds and cores. Typically, the curing occurs by heat curing.

Figure 1B:
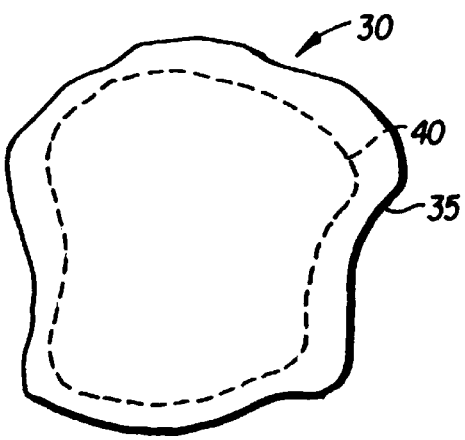
FIG. 1B shows a schematic drawing of a resin coated particle of the present invention for foundry use.

FIG. 1B shows coated particulate material 30 for use in a foundry. The material 30 comprises a sand particle 35 and a resin coating 40. The ingredients are combined to make a coated particulate material having from about 1 to about 6 weight percent coating composition (weight percent based on total coated particle weight). Also, the particle 35 on which the resin 40 is coated have a precoated size in the range of USA Testing Standard screen numbers from about 16 to about 270.

Hot tensile strength, melt point, modified melt point and other relevant parameters of foundry sand are defined as measured as described above for curable proppants. Typical hot tensile strengths of foundry sands of the present invention range from 50 to 500 psi or higher.

The cold tensile strength of coated foundry sand is defined as that measured as follows. Uncured sand is hand packed into a 3-cavity, quarter inch thick dog-bone mold, which has been equilibrated at 450° F. After curing for 3 minutes, the dog bones are removed. After the dog bones are cooled to ambient temperature, cold tensile strengths are determined using a low range universal sand strength machine manufactured by George Fisher Foundry Systems, Inc., Holly, Mich.

When employed as a foundry sand, the coated particulate material of the present invention has many advantageous properties. Moreover, the bisphenol homopolymer-based resins have high plasticity as evidenced by a downward deflection, when measured by a hot distortion test (described in the present examples). Thus, the coated particles are less prone to thermal shock. These homopolymer-containing resins have a faster resin breakdown as indicated by a time to break (during the hot distortion test) of between about 2.5 and about 4 minutes. The homopolymer resin has a high melt point. Thus, the coated particles are less prone to caking or lumping during storage.

4. Reacting Aldehyde With Bisphenol-aldehyde Polymers and Bisphenol Homopolymers Another way to modify bisphenol-aldehyde polymers and bisphenol homopolymers is to react these polymers with an additional quantity of aldehyde using a basic catalyst. Typical catalysts used are sodium hydroxide, potassium hydroxide, barium hydroxide, calcium hydroxide (or lime), ammonium hydroxide and amines.

In the case of bisphenol-aldehyde polymers, the molar ratio of added aldehyde to bisphenol, based on the bisphenol monomeric units in the novolak, ranges from 0.4:1 to 3:1, preferably from 0.8:1 to 2:1. This achieves a crosslinkable (reactive) polymer having different chemical structures and generally higher molecular weights than the resole polymers obtained by a single step process which involves initially mixing bisphenol monomers and aldehyde with an alkaline catalyst at the same molar ratio of the combined aldehyde and bisphenol. Furthermore, it is feasible to use different aldehydes at different stages of the polymer preparation.

When modifying the homopolymer, the aldehyde modified polymer has a series of repeating units each repeating unit being a bisphenolic moiety, the series having the following Formula III:

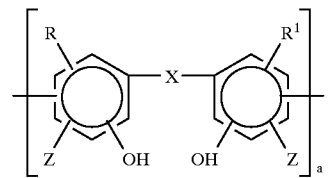

III wherein R and $R^1$ are independently selected from the group of alkyl, aryl, arylalkyl or H;

a is at least 2, preferably at least 3, X is a bond, sulfonyl, alkylidene unsubstituted or substituted by halogen, cycloalkylidene, and halogenated cycloalkylidene, wherein alkylidene is defined as by Formula II:

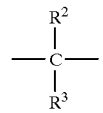

II wherein $R^2$ and $R^3$ are independently selected from alkyl, aryl, arylalkyl, H, halogenated alkyl, halogenated aryl and halogenated arylalkyl, and $R^2$ and $R^3$ are meta to the respective OH group of the respective aromatic ring of Formula III.

Z is H, another bisphenolic moiety, or CH[R⁴]OH, wherein R⁴ is alkyl, aryl, arylalkyl or H, preferably, methyl, ethyl, propyl, phenyl, alkylphenyl or H. However, at least one Z of the polymer is CH[R⁴]OH. Each repeating unit is attached to another repeating unit by a bond located ortho or para to an OH group of the repeating unit. Also, Z is attached to the repeating unit by a bond ortho or para to an OH group of the repeating unit. Thus, for example, two such repeating units link as in Formula IV:

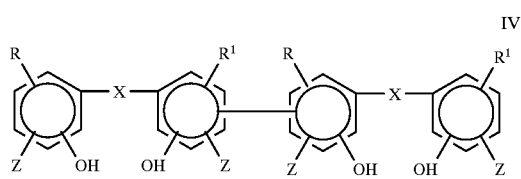

IV

Formula V as follows shows an example of a portion of one of many varieties of such polymers, using a bisphenol A homopolymer backbone and formaldehyde:

V

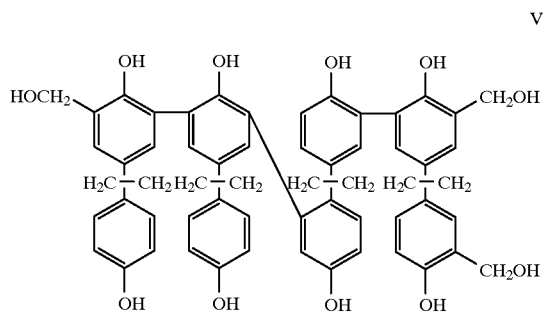

These aldehyde-modified polymers are useful in coating compositions for oil field proppants and foundry sands. These polymers can be used alone. These polymers can also be used with other polymers, such as phenol-aldehyde novolaks, bisphenol-aldehyde novolak, bisphenol homopolymers or mixtures thereof, as a crosslinking agent, or as a component of crosslinking agents. When the aldehyde-modified polymers are employed as crosslinking agents, they may be used with other typical crosslinking agents such as those described above for the bisphenol-aldehyde novolak polymers or bisphenol homopolymers of the present invention.

The present invention is further illustrated by the following non-limiting examples.

EXAMPLE 1

A bisphenol A-formaldehyde novolak polymer was prepared as follows. Two thousand grams of bisphenol A and 500.0 grams of n-butyl acetate were charged into a three-necked, five-liter flask equipped with a mechanical stirrer, a condenser, a thermometer and an addition funnel to form a mixture. Using an electric mantel, the mixture was heated to 140° F. to give a homogenous mixture. Then, 10.0 grams of oxalic acid were added to the mixture and mixed for five minutes. Then, 315.8 grams of 50 weight percent formaldehyde were added dropwise through the addition funnel. An exothermic reaction took place and a gentle reflux was initiated. Addition of all formaldehyde took 60 minutes and the mixture was refluxed for 5 hours. After refluxing, water and n-butyl acetate were collected by azeotropic distillation. Free formaldehyde content of the aqueous phase of the distillate was monitored periodically. If the free formaldehyde content was more than 0.5 percent, the distillate was returned to the flask. When the free formaldehyde was less than 0.5 percent, the distillate was removed. As the distillation progressed, temperature of the resinous product in the flask rose steadily to 340° F. At this point, the resinous product was flaked. The yield of the reaction was 2,150 grams and the resin was found to have 26.5 percent free bisphenol A with a melt viscosity of 80 seconds.

EXAMPLE 2

Generally, precured proppants were prepared by the following procedure. In an insulated mixing bowl of a Hobart mixer, 1,000 grams of T2380A sand, available from Badger Mining, Fairwater, Wis., were adjusted to a temperature of 385° F. 15.6 grams of resin were then added to the hot sand and mixed for 30 seconds in the Hobart mixer. 0.4 grams A1100 silane were then added and mixed for 30 seconds. A1100 silane is an organosilane coupling agent available from Union Carbide Corporation, Danbury, Conn. The chemical name of this coupling agent is 3-aminopropyltrimethoxysilane. Then 30.8 grams of resole resin, 3.9 grams of 40 percent HEXA solution and 0.9 gram of water were added to the mixture and mixed for 2.5 minutes. The resoles were either Oil Well Resole EX9000PR, or Oil Well Resin 9100, phenol-formaldehyde resins available from Borden Foundry and Industrial Resins, Westchester, Ill. Oil Well Resole EX9000PR and Oil Well Resin 9100 are very similar, except that they have different pHs. Subsequently, 1.0 gram of silicone fluid L-45, available from Dow Corning Corporation, Midland, Mich., was added to the mixture and mixed for another minute. The coated sand was removed, and postbaked at 350° F. for 12 minutes. Then the coated sand was cooled and sieved.

Using the above procedure, proppants coated with the bisphenol A-formaldehyde novolak of Example 1, bisphenol A homopolymer and phenol-formaldehyde novolak were prepared and the crush resistance at 10,000 psi was determined. These results are shown in the following Table 1 which compares the coated proppants and uncoated sand.

TABLE 1

| Crush Data of Various Procured Proppants | |
|---|---|
| Proppant Ingredient | % crush at 10,000 psi |
| Bisphenol A-formaldehyde novolak[1] | 4.3 |
| Bisphenol A homopolymer[2] | 4.0 |
| Phenol-formaldehyde novolak[3] | 3.9 |
| Uncoated T2380A sand[4] | 31.5 |

[1]Mole ratio of bisphenol A to formaldehyde in novolak portion of coating is 1:0.6.
[2]Enzymatic Resin IG, available from Enzymol International Inc., Columbus, OH
[3]Comparative Example: Plasti Flake EX5150, a commercial phenol-formaldehyde novolak available from Borden Foundry and Industrial Resins, Westchester, IL. The resulting proppant is a commercial product with a trade name of AcFrac® PR sold by Borden Foundry and Industrial Resins, Westchester, IL.
[4]Typical proppant grade sand from Badger Mining Inc., used frequently in oil well applications The data in Table 1 show that the resin coated proppants are far superior to withstanding crushing than the uncoated sand. The data also show differences among the different types of coatings are small and they are within experimental error. Thus, the resin coated proppants of the present invention are at least as strong as that of phenol-formaldehyde novolak. However, the proppants of the present invention have the advantage of less water solubility and minimizing or eliminating the presence of free phenol.

EXAMPLE 3

The following general coating procedures were followed to prepare curable proppants using HEXA as a crosslinking agent.

In a un-insulated mixing bowl of a Hobart mixer, 1,000 grams T2380A sand were adjusted to 280° F. 18 grams of resin were added to hot sand and mixed for 30 seconds. 0.4 gram A1100 silane was added to hot sand and mixed for another 40 seconds. 7.5 grams of a 40% HEXA solution, 1.0 gram L-45 silicone fluid and 8.0 grams water were subsequently added and the mixture were mixed for another 60 seconds. The sand was then removed from the bowl, cooled and sieved.

Using this procedure, curable proppants with bisphenol A-formaldehyde novolak, bisphenol A homopolymer, bisphenol F homopolymer, and phenol-formaldehyde novolak were prepared. Their properties are shown in Table 2.

TABLE 2

Properties of Curable Proppants

| Resin | Melt Point (°F.) | Hot Tensile (psi) |
|---|---|---|
| Bisphenol A-formaldehyde novolak[1] | 218 | 380 |
| Bisphenol A homopolymer[2] | 249 | 217 |
| Bisphenol F homopolymer[3] | 199 | 334 |
| Phenol-formaldehyde novolak[4] | 230 | 187 |

[1]Mole ratio of bisphenol A to formaldehyde in novolak portion of coating is 1:0.6.
[2]Enzymatic Resin IG, available from Enzymol International Inc., Columbus, OH
[3]Enzoresin ™ Bisphenol F Resin available from Enzymol International, Inc., Columbus, OH.
[4]Comparative Example: Plasti Flake EX5150, a commercial phenol-formaldehyde novolak available from Borden Foundry and Industrial Resins, Westchester, IL. The resulting proppant is a commercial product with a trade name of AcFrac ® CR 5000 sold by Borden Foundry and Industrial Resins, Westchester, IL.

The results in Table 2 show that bisphenol A and bisphenol F based polymers achieve higher strength than a typical phenol-formaldehyde novolak resin when these proppants were prepared in an identical manner.

EXAMPLE 4

The following general coating procedures were used to prepare curable proppants using a modified phenol-formaldehyde resole as a crosslinking agent.

In an un-insulated bowl of a Hobart mixer, 1,000 grams T2380A sand were adjusted to 360° F. 22 grams of resin (except as noted below) were added to the hot sand and mixed for 30 seconds. 0.4 gram A1100 silane was then added and mixed for another 30 seconds. Then, 22 grams Oil Well Resin EX33058 (a nonylphenol modified phenol-formaldehyde resole, available from Borden Foundry and Industrial Resins, Westchester, Ill.) were added and mixed for 165 seconds. 25 grams of water were then added to quench the reaction and subsequently 1.0 gram silicone fluid L-45 was added and mixed for another 60 seconds. The coated sand was then removed, cooled and sieved.

Using this procedure, curable proppants with bisphenol A-formaldehyde novolak polymer, bisphenol A homopolymer, bisphenol F homopolymer, and phenol-formaldehyde novolak polymer were prepared. Their properties are shown in Table 3.

TABLE 3

Properties of Curable Proppants

| Resin | Modified Melt Point (°F.) | Hot Tensile (psi) | Compressive Strength (psi) |
|---|---|---|---|
| Bisphenol A-formaldehyde novolak[1] | 218 | 165 | 600 |
| Bisphenol A homopolymer[2] | 196 | 152 | 375 |
| Bisphenol F homopolymer[3] | 187 | 204 | 675 |
| Phenol-formaldehyde novolak[4] | 214 | <30 | 300 |

[1]Mole ratio of bisphenol A to formaldehyde in novolak portion of coating is 1:0.6. 20 grams of Oil Well Resin EX33058 were used in this formulation
[2]Enzymatic Resin IG, available from Enzymol International, Inc., Columbus, OH
[3]Enzoresin ™ bisphenol F resin, available from Enzymol International, Inc., Columbus, OH.
[4]Comparative Example: Plasti Flake EX5150, a commercial phenol-formaldehyde novolak available from Borden Foundry and Industrial Resins, Westchester, IL. The resulting proppant is a commercial product with a trade name of AcFrac ® SB Ultra ® sold by Borden Foundry and Industrial Resins, Westchester, IL.

Data in Table 3 show that all proppants were higher in hot tensile strength and compressive strength than commercial phenol-formaldehyde novolak based proppant.

The proppants made with bisphenol A-formaldehyde novolak and phenol-formaldehyde resins were subjected to a long term conductivity test. Long term conductivity was measured as disclosed above. The results, as shown in the following Table 4, indicate that at a high closure stress (greater than 6,000 psi), the bisphenol A based proppant is more effective in maintaining conductivity.

TABLE 4

Long Term Conductivity Data of Curable Proppants

Conductivity at 50 Hours after Closure (darcies)

| Closure Stress (psi) | Bisphenol A-formaldehyde novolak[1]-containing proppant | Phenol-formaldehyde novolak[2]-containing proppant |
|---|---|---|
| 2000 | 202 | 234 |
| 4000 | 166 | 180 |
| 6000 | 139 | 119 |
| 8000 | 94 | 44 |

[1]Mole ratio of bisphenol A to formaldehyde in novolak portion of coating is 1:0.6. 20 grams of Oil Well Resin EX33058 were used in this formulation
[2]Comparative Example: Plasti Flake EX5150, a commercial phenol-formaldehyde novolak available from Borden Foundry and Industrial Resins, Westchester, IL. The resulting proppant is a commercial product with a trade name of AcFrac ® SB Ultra ® sold by Borden Foundry and Industrial Resins, Westchester, IL.

EXAMPLE 5

Resin was coated onto foundry sand by the following "hot coat" process. In a Hobart mixer, 1,000 grams Wedron 730 silica sand were heated to 300° F. Then 30 grams of resin were added to the hot sand to form a mixture. The mixture was mixed for 60 seconds. Then 16.3 grams of 27.6 weight percent HEXA solution were added. The mixture agglomerates and then breaks up. At breakup, 0.3 gram calcium stearate was added. The mixture was mixed for 60 seconds beyond breakup. Coated sand was screened and tested.

Data in Table 5 depicts a comparison of the foundry sands coated with Enzymatic Resin IG (a bisphenol A homopolymer, available from Enzymol International Inc., Columbus, Ohio), a commercial phenolic-formaldehyde novolak foundry binder system (Plasti Flake 1115, available from Borden Foundry and Industrial Resins, Westchester, Ill.), a 1:1 blend of these resins and Enzoresin™ bisphenol F homopolymer available from Enzymol International, Inc., Columbus, Ohio.

TABLE 5

Properties of Hot Coated Foundry Sands

|  | Enzymatic Resin IG | Enzymatic Resin IG/Plasti Flake 1115 (1:1, by weight) | Plasti Flake 1115 (Comparative Example) | Enzoresin ™ Bisphenol F homo-polymer |
| --- | --- | --- | --- | --- |
| Melt Point, °F. | 240 | 232 | 230 | 195 |
| Hot Tensile, psi | 435 | 375 | 350 | 366 |

The results showed that bisphenol A homopolymer increases melt point and hot tensile strength. An increase in melt point can translate to less susceptibility to caking during storage of the resin coated sands. Caking of resin coated sands can be a serious problem with some binder systems. Due to higher hot tensile strengths with the improved systems, it is possible to maintain strength by lowering the binder level. Thus, a cost saving can be achieved.

The binder systems of this example are also evaluated using the British Cast Iron Research Association (BCIRA) hot distortion test. Hot distortion bars 4.5 inches×1 inch× 0.25 inch (115 mm×25 mm×6 mm) made with the above resin coated sands were clamped at one end in a BCIRA hot distortion tester. A load was then applied on the opposite end. At the middle of the bar, the bar is heated with a flame. Upward and downward deflections are monitored at the end with the applied load.

Figure 4:
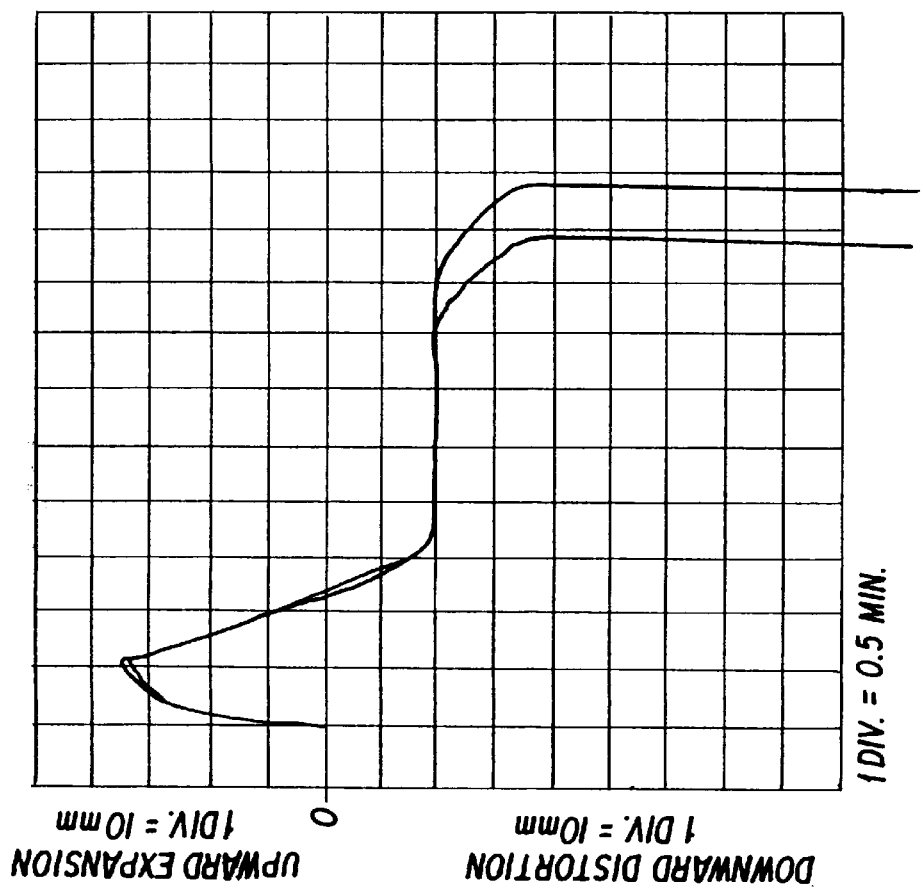
FIG. 4 shows, as a comparative example, hot distortion curves for bars made of phenol-formaldehyde novolak resin.

Hot distortion curves were generated by monitoring upward and downward deflections of the cured sand bar when it was heated at the middle by the small flame as a function of time. Each of FIGS. 2 to 5 shows two curves for two respective samples. When the bar was heated from one side of the bar, the heated side expanded and a upward deflection was observed. Upward expansion depends on the type of refractory and resin used. As the bar was heated further and degradation of the resin progressed, the bar began to bend downwards due to the applied load. As degradation of the resin progressed, the bar finally broke (as indicated by the sharp drop at the end of the curves of FIGS. 2–5). The downward movement gave a general idea on the rigidity of the system. In FIG. 4 (Plasti Flake 1115), the downward deflection was minor and flat, indicating the system was rather rigid. However, in FIGS. 2 and 3 (Enzymatic Resin IG-containing resin coated sand), the curves demonstrated plasticity, suggesting that the bars had more flex, providing resistance to thermal shocks. Times to break for bisphenol homopolymer-containing resin coated sands were significantly shorter than that of the commercial system. This suggested better shakeout characteristics. Upward and downward deflection and time to break shown in FIGS. 2 to 5 are summarized in Table 6.

TABLE 6

Hot Distortion Data for Hot Coated Foundry Sand

| Resin | Enzymatic Resin IG | Enzymatic Resin IG/ Plasti Flake 115 (1:1, by weight) | Plasti Flake 1115 (Comparative Example) | Enzoresin ™ Bisphenol F homopolymer |
| --- | --- | --- | --- | --- |
| Upward Deflection, mm | 25 | 27 | 34 | 51 |
| Downward Deflection, mm | 50 | 30 | 20 | 10 |
| Time to break, min. | 3.1 | 3.2 | 4.6 | 2.7 |

The data indicates that the resin coated sands containing bisphenol A homopolymer were more plastic and collapsed faster than the Plasti Flake 1115 binder. The resin coated sands containing bisphenol F homopolymer also collapsed faster than the Plasti Flake 1115 binders. These properties can provide cores and molds with better resistance to thermal shock and/or faster shakeout.

EXAMPLE 6

Resin was coated on foundry sand by a liquid shell ("warm coat") process. Enzymatic Resin CG (a bisphenol A homopolymer, available from Enzymol International, Inc., Columbus, Ohio) was dissolved in acetone to obtain a 50 percent (by weight) solution. A control resin sand using the Liquid Shell Resin 789H resin (a phenol-formaldehyde novolak resin available from Borden Foundry and Industrial Resins, Westchester, Ill.) was also prepared. Then 140.0 grams of the 50% bisphenol A homopolymer solution, 10.0 grams HEXA powder and 1.65 grams calcium stearate were thoroughly mixed in a 250 ml flask. With a Hobart mixer, 136.5 grams of this mixture was mixed into 3,000 grams Wedron 730 sand at 113° F. (45° C.). Initially, the sand/resin mixture formed clumps. With further mixing, the clumps broke up. After breakup, 1.65 grams calcium stearate were added and the mixture was mixed for another 10 minutes. Coated sand was sieved and tested.

Liquid Shell Resin 789H was coated in a similar procedure. Due to the differences in solids content of these liquid resins, the quantity of Liquid Shell Resin 789H was adjusted to match that used for Enzymatic Resin CG resin solution. The initial mixture was prepared with 100.0 grams Liquid Shell Resin 789H, 10.0 grams HEXA and 1.65 grams calcium stearate. Only 119.0 grams of the mixture was added to sand for coating. Properties of these resin coated sands are shown in Table 7. Melt point and tensile strengths of these resin coated sands were measured as disclosed above.

TABLE 7

Properties of Warm Coated Foundry Sands

|  | Enzymatic Resin CG | Liquid Shell Resin 789H |
|---|---|---|
| Melt Point, °F. | 242 | 214 |
| Hot Tensile, psi | 265 | 242 |
| Cold Tensile, psi | 310 | 268 |

Data in Table 7 showed that the sand coated with bisphenol A homopolymer was higher in melt point and tensile strengths. These observations were similar to those resin coated sands in the hot coated process.

Figure 6:
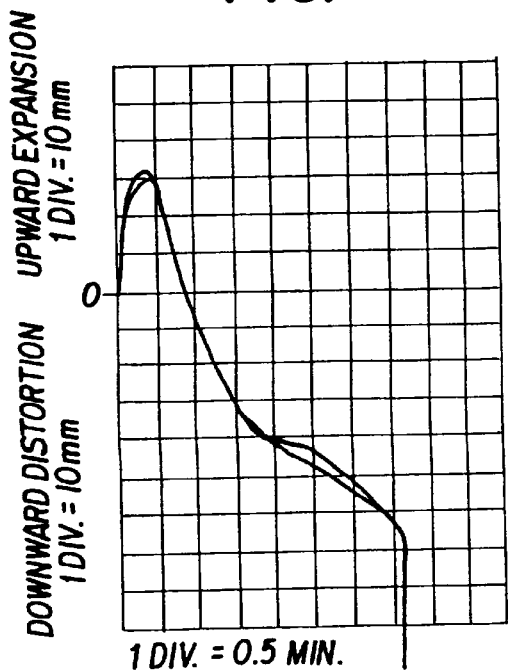
FIG. 6 shows hot distortion curves for bars made of a bisphenol A homopolymer.
Figure 7:
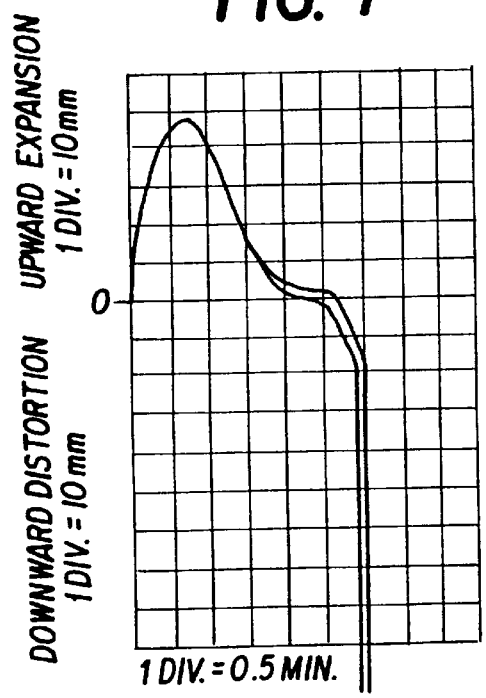
FIG. 7 shows hot distortion curves for bars made of a phenol-formaldehyde novolak polymer.
Figure 3:
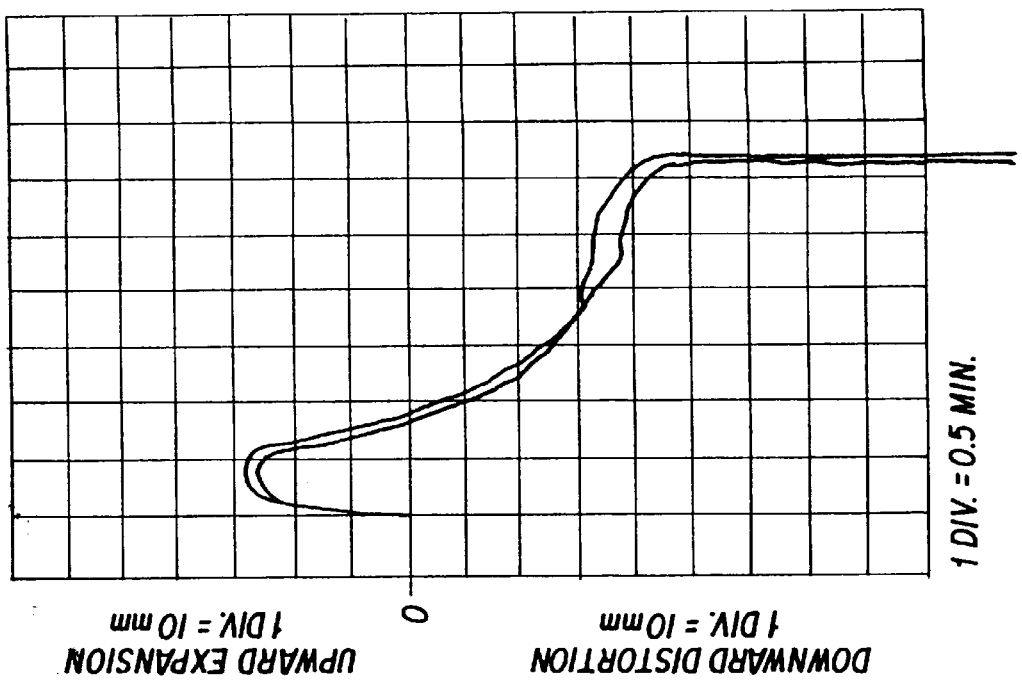
FIG. 3 shows hot distortion curves of bars made of a blend of bisphenol A homopolymer and a phenol-formaldehyde novolak resin.
Figure 2:
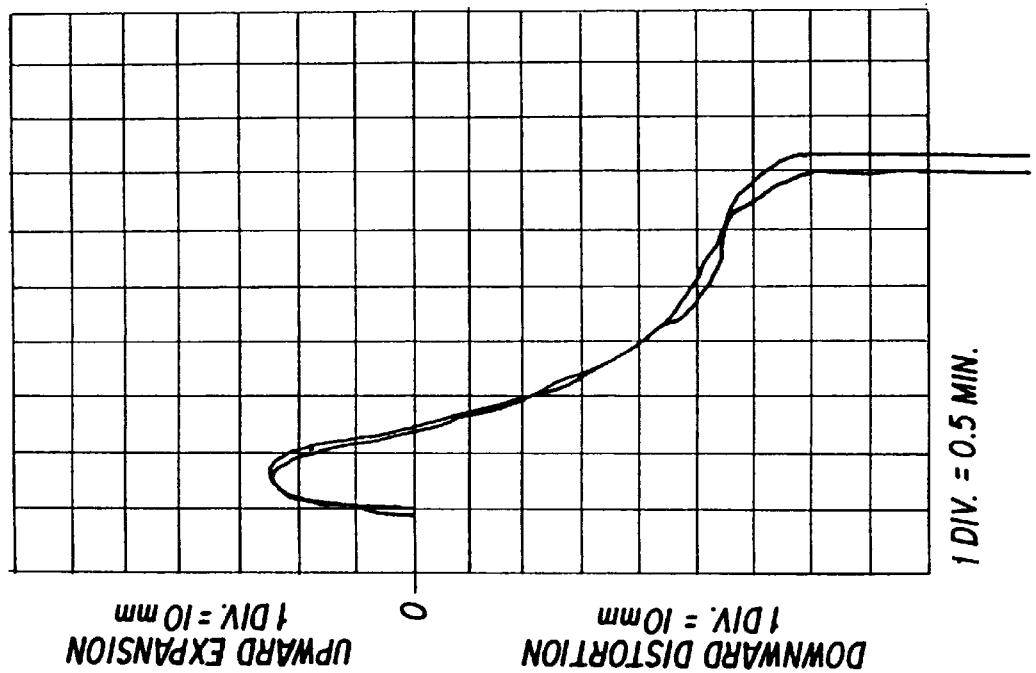
FIG. 2 shows hot distortion curves of bars made with bisphenol A homopolymer.
Figure 5:
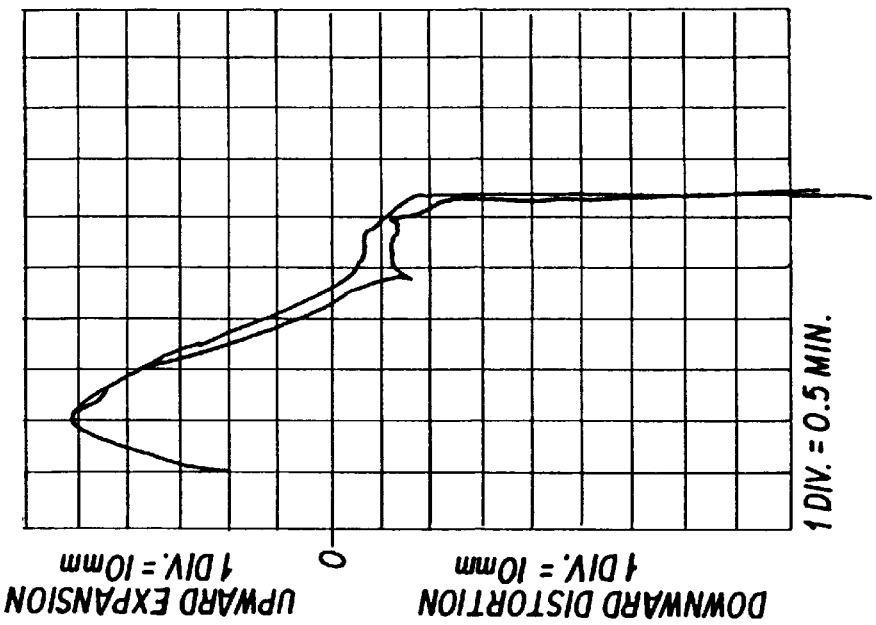
FIG. 5 shows hot distortion curves for bars made of a bisphenol F homopolymer.

Hot distortion test curves of these sands coated with Enzymatic Resin CG and Liquid Shell Resin 789H are illustrated by FIGS. 6 and 7, respectively. Some important parameters from these figures are shown in Table 8.

TABLE 8

Hot Distortion Data for Warm Coated Foundry Sand

| Resin | Enzymatic Resin CG | Liquid Shell Resin 789H |
|---|---|---|
| Upward Deflection, mm | 30 | 47 |
| Downward Deflection, mm | 65 | 10 |
| Time to Break, min. | 3.6 | 2.9 |

Similar to "hot coated" resin coated sands of Example 5, the "warm coated" foundry sand coated with bisphenol A homopolymer is more plastic than Liquid Shell Resin 789H. However, the time to collapse for bisphenol A homopolymer was longer than for Liquid Shell Resin 789H.

EXAMPLE 7

Preparation of Low Temperature Acid Curable Resin Coated Proppant

In an uninsulated bowl of a Hobart mixer, 1000 grams of T2380A sand were adjusted to 385° F. 15 grams of novolak flake resin were added and mixed for 30 seconds. At this time, 0.3 gm of A1100 silane was added. Mixing was continued for an additional 20 seconds and 33.0 grams of Oil Well Resole EX34641 (a phenol-formaldehyde resole available from Borden Foundry and Industrial Resins, Westchester, Ill.) were added to the mixture. At 105 seconds of total mixing time, 30 ml of water were added to the mixture. At 210 seconds, the sand was removed from the bowl. The coated sand was sieved through a 16 mesh screen and analyzed. Using this procedure, three resin coated sands was made with different flakes, namely, a phenol-formaldehyde novolak; a bisphenol A-formaldehyde novolak; and bisphenol A homopolymer. Properties of the coated sands are shown in the following Table 9.

TABLE 9

Properties of Acid Curable Resin Coated Proppant

|  | Phenol-formaldehyde Novolak[1] | Bisphenol A-formaldehyde Novolak[2] | Bisphenol A Homopolymer[3] |
|---|---|---|---|
| Modified Melt Point, °F. | >260 | 247 | >260 |
| Hot Tensile Strength, psi | 288 | 280 | 305 |

[1]Plasti Flake EX5150, a commercial phenol-formaldehyde novolak available from Borden Foundry and Industrial Resins, Westchester, IL.
[2]Mole ratio of bisphenol A to formaldehyde in this novolak is 1.0:0.6.
[3]Enzymatic Resin IG, available from Enzymol International, Inc., Columbus, OH.

EXAMPLE 8

Consolidation of Low Temperature Acid Curable Resin Coated Proppant

In contrast to Example 4, compressive strength was measured of a sample prepared as follows. A plastic test-tube (1 inch inner diameter and 4 inches long) was filled to about 0.5 inch from the top with the resin coated sand of Example 7. A curing fluid (4 parts water, 4 parts acetone, and 2 parts sulfuric acid, by weight) was added to the tube in a manner that all the air among the sand grains was displaced by the fluid. The tube was stopped and placed in a 104° F. water bath for 24 hours to cure. After the curing time, the consolidation sand mass was removed from the tube and cut into a 2 inch long specimen for compressive strength measurements using the Detroit tensile tester. The results are shown in the following Table 10.

TABLE 10

Compressive Strength of Acid Curable Resin Coated Proppant

|  | Phenol-formaldehyde Novolak[1] | Bisphenol A-formaldehyde Novolak[2] | Bisphenol A Homopolymer[3] |
|---|---|---|---|
| Compressive Strength, psi | 85 | 105 | 125 |

[1]Plasti Flake EX5150, a commercial phenol-formaldehyde novolak available from Borden Foundry and Industrial Resins, Westchester, IL.
[2]Mole ratio of bisphenol A to formaldehyde in this novolak is 1.0:0.6.
[3]Enzymatic Resin IG, available from Enzymol International, Inc., Columbus, OH.

Table 10 shows the superiority of the bisphenol A-formaldehyde novolak and bisphenol A homopolymer over phenol-formaldehyde novolak.

While specific embodiments of the composition and method aspects of the invention have been shown and described, it should be apparent that many modifications can be made thereto without departing from the spirit and scope of the invention. Accordingly, the invention is not limited by the foregoing description, but is only limited by the scope of the claims appended thereto.

We claim:

1. A coated particle useful in production of foundry shell molds and foundry cores, comprising:
   a granular refractory substrate;
   a curable coating composition coated on the substrate, the composition comprising:
   (i) a resin selected from the group of a bisphenol-aldehyde novolak polymer and a bisphenol homopolymer, the bisphenol component of the novolak polymer and homopolymer having a Formula I:

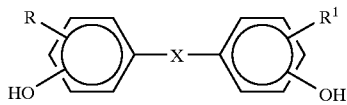

wherein R and R¹ are independently selected from the group of alkyl, aryl, arylalkyl and H, and are located meta to the respective OH group of the respective aromatic ring of Formula I;

X is a bond, sulfonyl, alkylidene unsubstituted or substituted with halogen, cycloalkylidene, and halogenated cycloalkylidene, with the proviso that alkylidene is defined by Formula II:

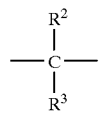

wherein R² and R³ are independently selected from H, alkyl, aryl, arylalkyl, halogenated alkyl, halogenated aryl and halogenated arylalkyl;

with an absence of bisphenol F for the novolak polymer; and (ii) a crosslinking agent, wherein the composition comprises at least about 10 weight % of the novolak polymer and R² and R³ of the novolak polymer are independently selected so there is an absence of bisphenol E.

wherein the novolak polymer has a bisphenol:aldehyde molar ratio from about 1:0.85 to 1:0.4.

2. A coated particle useful in production of foundry shell molds and foundry cores, comprising:

a granular refractory substrate;

a curable coating composition coated on the substrate, the composition comprising:

(i) a resin selected from the group of a bisphenol-aldehyde novolak polymer and a bisphenol homopolymer, the bisphenol component of the novolak polymer and homopolymer having a Formula I:

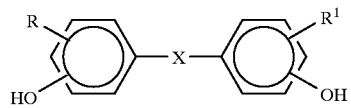

wherein R and R¹ are independently selected from the group of alkyl, aryl, arylalkyl and H, and are located meta to the respective OH group of the respective aromatic ring of Formula I;

X is a bond, sulfonyl, alkylidene unsubstituted or substituted with halogen, cycloalkylidene, and halogenated cycloalkylidene, with the proviso that alkylidene is defined by Formula II:

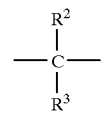

wherein R² and R³ are independently selected from H, alkyl, aryl, arylalkyl, halogenated alkyl, halogenated aryl and halogenated arylalkyl;

with an absence of bisphenol F for the novolak polymer; and (ii) a crosslinking agent, wherein the composition comprises at least about 10 weight % of the bisphenol homopolymer.

3. A shaped article, selected from the group consisting of foundry cores and molds comprising coated particles of claim 2.

4. The coated particle of claim 1, wherein the crosslinking agent is selected from the group consisting of paraformaldehyde, oxazolidines, phenol-aldehyde resole polymer and mixtures thereof.

5. The coated particle of claim 4, wherein the coating composition comprises from about 20 to about 90 weight percent resole polymer, phenol of the resole polymer is unsubstituted phenol, and the resole polymer has a phenol:formaldehyde molar ratio from about 1:1.2 to about 1:3.

6. The coated particle of claim 1, wherein the coating composition comprises about 5 to about 25 weight percent, based on weight of the coating composition, hexamethylenetetramine in the absence of free phenol.

7. A shaped article, selected from the group consisting of foundry cores and molds comprising coated particles of claim 4.

8. A method for using coated foundry sand to produce foundry cores and molds, comprising the steps of:

providing coated particles of claim 1, wherein the coated particles comprise the coating composition in an amount of about 1 to about 6% by weight of the refractory substrate;

forming the coated particles into a mass of a desired shape, and then curing the coating composition.

9. A method for using coated foundry sand to produce foundry cores and molds, comprising the steps of:

providing coated particles of claim 2, wherein the coated particles comprise the coating composition in an amount of about 1 to about 6% by weight of the refractory substrate;

forming the coated particles into a mass of a desired shape, and then curing the coating composition.

10. The method of claim 8, wherein the resin of the coating composition comprises the homopolymer in an amount of at least about 20% by weight of the coating composition.

11. The coated particle of claim 8, wherein the coating composition comprises at least 10 weight % of the novolak polymer and R² and R³ of the novolak polymer are independently selected so there is an absence of bisphenol E.

12. A method for making an aldehyde-modified polymer consisting of the steps of:

making a member of the group consisting of a bisphenol-aldehyde novolak polymer, a bisphenol homopolymer and mixtures thereof; and reacting the member with an aldehyde under alkaline conditions.

13. The method of claim 12, wherein sufficient aldehyde is added such that the molar ratio of added aldehyde to bisphenol ranges from about 0.4:1.0 to about 3:1.0.

14. A polymer made by the method of claim 12, wherein the member is selected from the bisphenol homopolymer and the mixtures of the novolak polymer and the homopolymer.

15. A proppant comprising a particulate substrate and a coating composition coated on the substrate, the coating composition comprising the aldehyde-modified polymer made by the steps of claim 12.

16. A foundry sand comprising a granular refractory substrate and a coating composition coated on the substrate, the coating composition comprising the polymer of claim 14.

17. A shaped article, selected from the group consisting of foundry cores and foundry molds comprising the foundry sand of claim 16.

18. The coated particle of claim 1, wherein all novolak contacting the granular refractory substrate consists essentially of said bisphenol-aldehyde novolak polymer.

19. The coated particle of claim 1, wherein all novolak contacting the granular refractory substrate consists of said bisphenol-aldehyde novolak polymer.

20. A process for making a bisphenol-aldehyde novolak polymer comprising the sequential steps of:

mixing, to form a mixture at elevated temperature, a solvent with at least one bisphenol of Formula I:

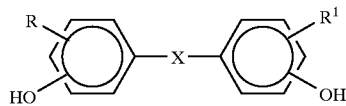

I wherein R and $R^1$ are independently selected from the group of alkyl, aryl, arylalkyl and H, and are located meta to the respective OH group of the respective aromatic ring of Formula I;

X is a bond, sulfonyl, alkylidene unsubstituted or substituted with halogen, cycloalkylidene, and halogenated cycloalkylidene, with the proviso that alkylidene is defined by Formula II:

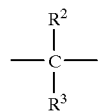

II wherein $R^2$ and $R^3$ are independently selected from H, alkyl, aryl, arylalkyl, halogenated alkyl, halogenated aryl and halogenated arylalkyl, wherein there is an absence of bisphenol F;

adding a catalyst selected from the group consisting of acid catalyst and divalent metal catalyst to said mixture;

adding an aldehyde to said mixture; and refluxing the mixture.

21. The coated particle of claim 1, consisting essentially of said substrate and said curable coating composition coated on the substrate, said composition consisting essentially of said resin and said crosslinking agent.

22. The coated particle of claim 1, wherein the resin is made by a process comprising the sequential steps of:

mixing at least one bisphenol of Formula I with a solvent to form a mixture at elevated temperature;

adding a catalyst selected from the group consisting of acid catalyst and divalent metal catalyst to said mixture;

adding an aldehyde to said mixture; and refluxing the mixture.

23. The coated particle of claim 3, wherein said catalyst is said divalent metal catalyst.

24. The coated particle of claim 21, wherein said solvent comprises n-butyl acetate.

25. The coated particle of claim 21, wherein said solvent comprises water.

26. The coated particle of claim 21, wherein the coating is applied to the substrate by mixing the resin and crosslinking agent in a solution and mixing the solution with the substrate and then removing the solvent.

27. The process of claim 20, wherein the novolak polymer has a bisphenol:aldehyde molar ratio from about 1:0.85 to 1:0.4.

28. The coated particle of claim 1, wherein the novolak polymer has a bisphenol:aldehyde molar ratio from about 1:0.6 to 1:0.4.

* * * * *